United States Patent [19]

Bourcier de Carbon de Previnquieres

[11] 3,951,194
[45] Apr. 20, 1976

[54] ANTI-SKID DEVICE
[76] Inventor: Alain J. M. Bourcier de Carbon de Previnquieres, 6, Boulevard Victor Hugo 06, Nice, France
[22] Filed: July 17, 1974
[21] Appl. No.: 489,166

[30] Foreign Application Priority Data
July 20, 1973 France .............................. 73.28094
May 30, 1974 France .............................. 74.19642

[52] U.S. Cl. ................................ 152/221; 152/222
[51] Int. Cl.² ......................................... B60C 27/00
[58] Field of Search ............... 152/170, 185, 213 R, 152/213 P, 221–231, 239–244; 24/66 CF, 66 TT, 73 CF, 201 BW, 232 CR, 221, 265 WS

[56] References Cited
UNITED STATES PATENTS

| | | | |
|---|---|---|---|
| 1,871,424 | 8/1932 | Olmstead | 152/221 |
| 2,498,523 | 2/1950 | Bergen | 152/222 |
| 2,593,064 | 4/1952 | Silberman | 24/221 R |
| 2,915,101 | 12/1959 | Kratz | 152/222 |
| 3,657,774 | 4/1972 | Reynolds | 24/73 CF |
| 3,714,976 | 2/1973 | Caldwell | 152/228 |

FOREIGN PATENTS OR APPLICATIONS 266,149 2/1927 United Kingdom ............... 24/230.5

Primary Examiner—Drayton E. Hoffman
Assistant Examiner—Martin

[57] ABSTRACT

Anti-skid means for front or rear vehicle tires comprising shoes of pliant material around the tire held in place by lengthwise chains terminating in hooks lying against the outer and inner side walls, which shoes are one-piece with a ribbed and textured central portion for the tread and sides and means for removably holding the shoes and associated shackles in place during rotation of the wheel of the vehicle. The parts are specially designed to give good traction and comfortable riding qualities on icy and snowy surfaces with reduced wear.

9 Claims, 15 Drawing Figures

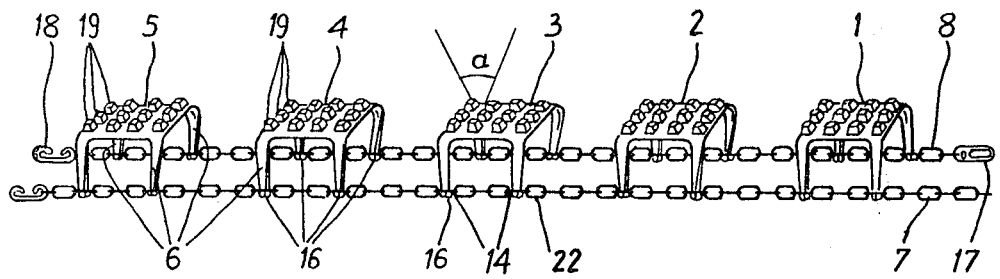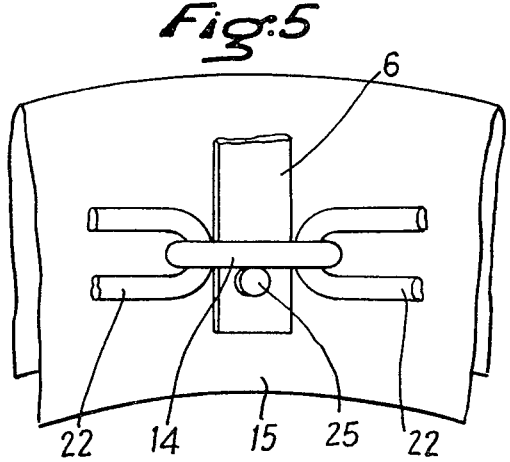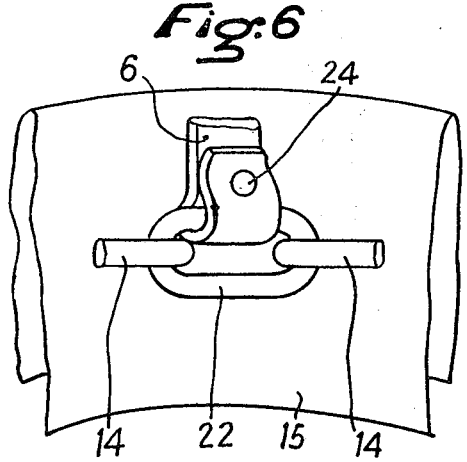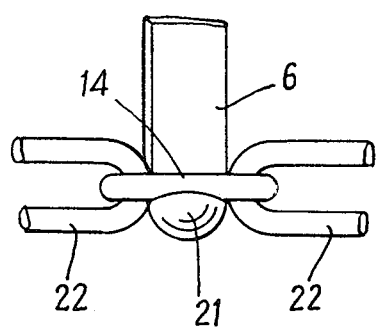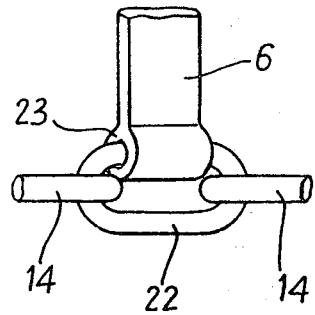

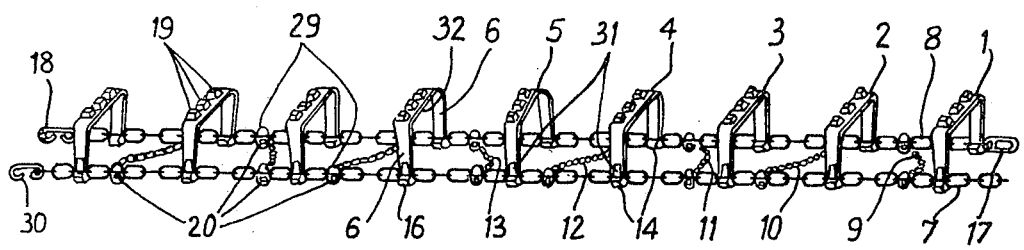
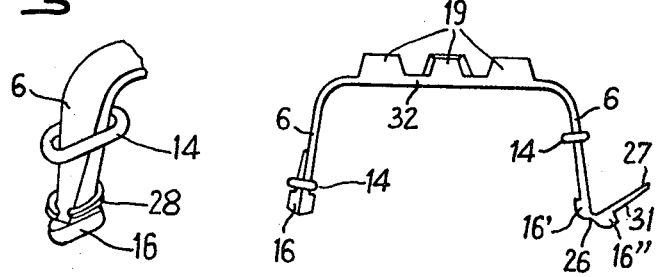
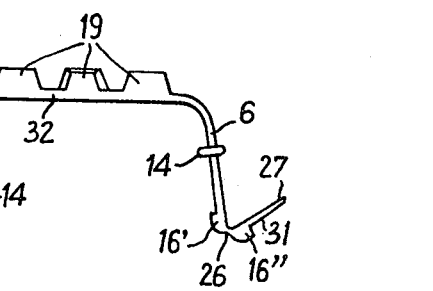
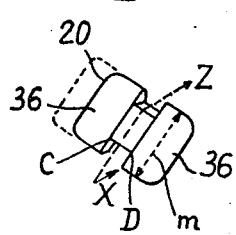
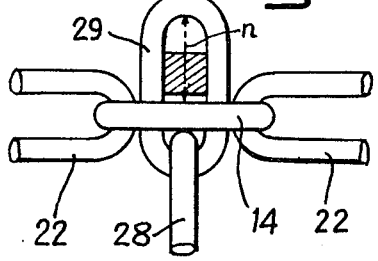
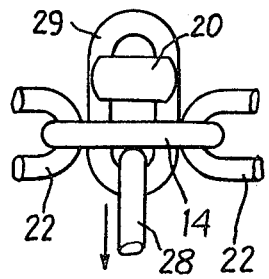
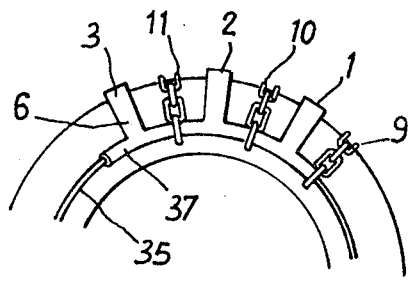

ANTI-SKID DEVICE

There are anti-skid devices consisting of lengthwise chains joined by crosswise connections arranged ladder-fashion around the tire, the ends of the lengthwise chains being joined together.

There are also snow shoes to be attached to the tire separately, being joined together at the side walls when in place.

Another arrangement consists of treads to be attached to the tire and provided with anti-skid features.

These various arrangements all have their disadvantages.

For some, installation on the tire as well as removal are neither quick nor convenient. It is necessary to get under the car, a dirty and time-consuming job. Besides, the firmness of attachment of the fastenings to the tire is unsatisfactory. Known fastenings pass through openings at the rim, and are soon sheared off at that point by lateral motions of the vehicle.

To mitigate these drawbacks, motorists prefer to purchase studded or snow tires for winter, which often means buying extra wheels as well to be carried in the trunk, studded tires being often prohibited at certain times and in certain areas.

On the other hand, the need for skid chains in heavy snow or on thick ice, especially with a steep grade, is undeniable. For such extreme conditions, chains have never been superseded by shoes of pliant material (rubber), even if studded or cleated; shoed wheels will slip and fail to provide traction in places that can be negotiated successfully with chains.

But whenever a vehicle equipped with chains on the tires encounters a clear road surface, especially if hardened by the cold, and picks up any speed, the tire begins to vibrate and transmits a scarcely tolerable motion to the body when reaching 40 km per hour, and at 50 km per hour or more, the chains will often fail, not to mention the resulting damage to the roadway, the noise, and the rapid wear on the chains.

Contrariwise, the shoe, because of its large area, has the shortcoming of transmitting vibrations to the body at low speed (under 30 km per hour), the tire as it were climbing up one side of each shoe and down the other, and so on. Above 30 km per hour, however, especially on hard pavement, these vibrations disappear, and the shoes will allow the car to travel faster, ride more comfortably and hold the road much better than with skid chains.

The means according to the invention serve to avoid these disadvantages. Its characteristics are as follows.

1. For each rear or front tire, it comprises a plurality of shoes of pliant material ringing the tire, on which they are held by two lengthwise chains ending in hooks, one to lie against the outer and the other against the inner side wall of the tire, like ladder chains; these shoes are in one piece, with a ribbed and textured central portion for the tread and side pieces, all alike, on either side of said central portion, embracing the side walls, each side piece terminating in a shackle, said shackles being engaged in the links of the lengthwise chains and holding the shoes in place as the wheel goes around under the moving vehicle, but removable.

2. It is composed of two lengthwise link chains joined together, as by the rungs of a ladder, by shoes of pliant material having side pieces with shackles removably engaging the links of the lengthwise chains and arranged alternately with connections consisting of lengths of chain of known type attached at their ends to links of the lengthwise chains.

3. The shackles at the ends of the side pieces of the shoes have a cross sectional shape such as to fit in the openings of the links of the lengthwise chains and are joined to the shoes by a portion of substantially square cross section, the side of the square substantially equal to the width of the link opening, this portion having a length at least equal to the thickness of the link, and the shackles stand perpendicular to the plane of the shoe.

4. The shoes are in the form of flat connections of textured plastic material of length matching the width of the tire and around 3° to 5 cm wide, with a side piece at each end.

5. The shackles terminating the side pieces are formed by bending back the ends of the side pieces, which have enlargements separated by a constriction, the thickness of the enlargements matching the width of the link opening.

6. The shackles are supplemented by a collar in the form of a split ring placed over the side pieces after inserting the shackles in the links.

7. The shoes are textured in such relief that the full thickness on the tire is greater than the width of the links of the lengths of chain serving as connections.

8. The chain link connections are attached to the lengthwise chains by removable means.

9. Said means consist of members having two shackles as under (3) above, joined by a portion of substantially square cross section, the side of the square matching the width of the link opening, and of length at least equal to the thickness of the stock of which the link is made.

The invention is illustrated by the accompanying drawing, wherein:

FIG. 4 shows a modification of the invention;

FIGS. 5 to 8 show modified forms of link and shackle assemblies;

FIG. 9 shows a preferred modified embodiment of the invention;

FIGS. 10 and 11 show further modified embodiments of the shackle;

FIGS. 12 to 14 illustrate the attachment of chain connections by means of double shackles;

FIG. 15 illustrates a modified embodiment with the lengthwise chains replaced by curved members.

The arrangement of FIGS. 1 to 8 comprises for example five like shoes 1, 2, 3, 4, 5 held by side pieces 6, all alike, to two lengthwise chains 7 and 8.

Each shoe comprises a central portion for the tire tread, bearing ribs on both surfaces, the one in contact with the tire and the one in contact with the road.

The ribs in contact with the tire prevent the shoe from slipping on the tire; those, 19, in contact with the road add stability and will dig into snow or ice, especially if studded.

Figure 1:
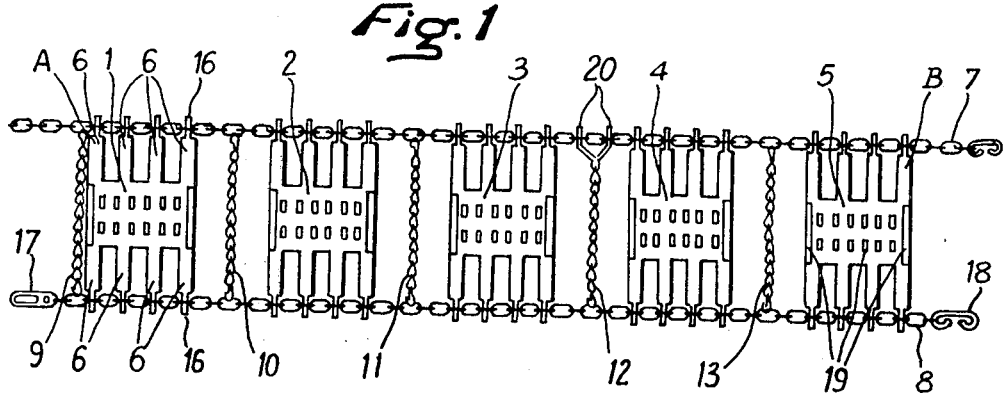
FIG. 1 is a view of the anti-skid means according to the invention, spread flat.

In FIG. 1, each shoe comprises four side pieces on each side of its central portion, but the numbers of shoes and side pieces will vary according to the shoe length.

Each side piece 6 terminates in a shackle 16 engaged in a link 14 lying in a plane perpendicular to the side wall of the tire. Now only every other link is in that position. Therefore the shackles, though in consecutive rows, will engage only every other link.

Figure 3:
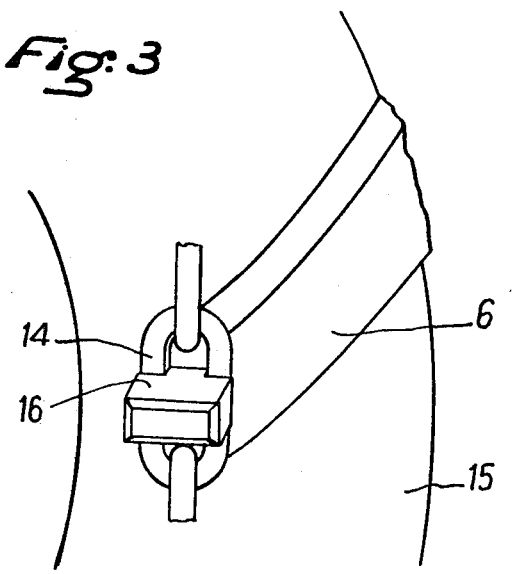
FIG. 3 shows a shackle secured in a link as applied to a tire.

Thus in FIG. 3 it is seen that side piece 6, by the two ends of its shackle 16, holds on to the two straight portions of link 14, which is perpendicular to the side wall of the tire 15. Thus the shackles 16 serve to hold the side pieces 6 and hence the shoes to the chain.

Each shackle 16 (FIG. 2) is perpendicular to its side piece 6 and separated from it by an interval CD equal to or slightly greater than the diameter of the link stock, to allow any link 14 (FIG. 3) to be inserted.

It is preferable (FIG. 2) to design the side piece 6 as a whole wider than it is in the interval CD, firstly because of road wear, and secondly so that under stress the elongation of the side piece and hence its deformation will be less, such elongation occurring first at the weakest point, namely CD.

If a section is taken at ZX (FIG. 2), at right angles to CD, we obtain a square ijkl of side equal to or slightly greater than the distance between the straight sides of the link.

If such a section is taken in the shackle 16 at OPQ, we obtain a rectangle efgh substantially matching the clear space inside the link.

Figure 2:
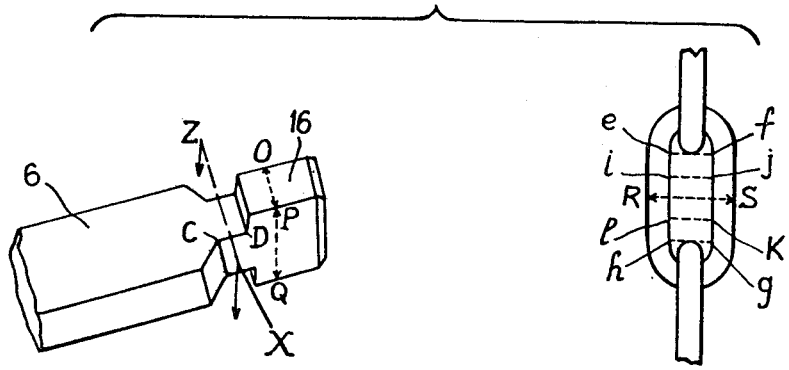
FIG. 2 is a detail view of a disassembled shackle and link of the anti-skid means of FIG. 1.

To facilitate insertion of the shackle in the link, the head may be beveled as indicated in FIGS. 2 and 3.

Thus to attach a side piece to a link, the former must be twisted a quarter of a turn and the shackle inserted in the link. When the shackle has gone all the way through and the link enters the interval CD, it must be given a quarter-turn in the opposite direction.

The portion ijkl of the side piece will then rotate and at first encounter resistance at the thickest part of the side piece inside the link, namely along the diagonal ik. The two diagonals ik and jl will act at each end as projections alternately functioning as springs to automatically hold the shackle 16 in position perpendicular to the two straight sides of the link 14 (FIG. 3), on which the shackle will then rest to hold the side piece and hence the shoe to the chain.

The method has the advantage of being so simple that there is no need for any separate fastening to hold the shoe to the chain. Shoe, side pieces and shackles are all of a piece and can be made in one mold.

Furthermore, the shoes are removable, which is a great advantage, since the chains and the shoes can be sold separately; firstly, the user can replace worn shoes at will, and secondly assembly labor cost is saved, reducing the cost of the system; lastly, it becomes unnecessary to stock as many types of chains as there are tire sizes. In practice, two shoe sizes will suffice, the chains being simply cut to the length desired for the tire. Thus the accessories dealer will not keep running out of one or another type of chain, and can always fill orders as long as he has any shoes and chain in stock.

The shoes may be made of plastic material having a high unit tearing strength, 5 kilograms per square millimeter, such as polyurethane; then each side piece will be almost as strong as the lengthwise chain holding it.

The square ijkl (FIG. 2) may thus be 7 mm on a side, and 49 square millimeters in area. Therefore the strength of each side piece will be $49 \times 5 = 245$ kg. This stress is divided by 2 at the shackle, where each end will transmit 245/2 kg.

The shoes just described will serve to negotiate any snow- or ice-covered road, especially if molded with sufficiently sharp and hard projections to dig into frozen snow or ice, and more especially if the projections are studded. But, for exceptionally severe conditions (unusually deep snow), transverse skid chain connections may be added (9 to 13 in FIG. 1). These connections will be attached, alternating with the shoes, to the lengthwise chains 7 and 8 by some removable means, for example snap hooks.

The arrangement of FIG. 9 has no wide shoes, of any great area, at least 10 centimeters long and as wide as the tire, but narrow shoes in the form of strips (1, 2, 3, 4, 5 . . . , FIG. 9) of pliant material (compact polyurethane, 90 Shore A), but less pliant than rubber (50 to 60 Shore A), so that they will not flip over when the brakes take hold.

These strips are light (35 to 40 grams), containing a small amount of material, and hence inexpensive. Like the shoes, they are the width of the tire, but their length is only about 3 cm for an average-size tire ($145 \times 14$), and 4 centimeters for big touring cars, these dimensions being given merely by way of suggestion.

Their central portion at the tread has a sole 3 to 4 mm thick with a row of ribs about 9 mm thick, so that the total thickness of the pliant strips on the tire tread is about 13 mm.

On either side of the central portion of the strip there is a side piece embracing one side wall of the tire and engaging a link of one of the two lengthwise chains holding the pliant strips to the tire.

Each side piece terminates in a fastening means rendering it removable and molded in one piece with it.

According to the invention, connections of conventional skid chain lengths likewise attached to the lengthwise chains with removable fastenings may alternate with the pliant strips at close regular intervals.

On the tire, these lengths of skid chain will be about 9 mm thick, or less than the thickness of the pliant strips.

Therefore, when the car starts, each strip bears on the road, whether strips of skid chain or strips of pliant material.

All the merits of the chain, which are especially pronounced in starting, are retained.

The tire moves alternately from a chain connection to a pliant strip, without transmitting vibrations to the body, since the connections, owing to their small transverse area, will retract as it were into the tire, which will be in contact with the road front and rear, yielding only at the crosswise member itself. The vibration problem of snow shoes is eliminated.

Up to about 25 km per hour, the succession of crosswise members is distinctly felt on a hard surface.

From 25 to 40 km per hour, there is a gradual selection of chain noise and vibration.

The disturbance caused by the skid chains has disappeared completely at 40 km per hour and above. The chain noise too has practically disappeared, and only the sound of the pliant strips in contact with the pavement is noticeable.

This selection is due to the speed, to the projection of the pliant strips (12 mm) beyond the chain connections (9 mm), and to the merging of all the crosswise members together at regular intervals.

It is as though from a certain speed on, the tire goes from one pliant strip to the next, skipping the chain connections, which therefore, not being squeezed against the road, but merely grazing it, wear much less rapidly.

With this arrangement, it is possible to travel on a clear road between 60 and 80 km per hour in comparable comfort to snow tires, and excellent road holding performance. On snow or ice, furthermore, the tires hold the road much better than with conventional skid chains.

The small area of the pliant strips, with a single row of ribs, together with the fact that the ribs work differently from the more numerous ones of shoes, has the result that the snow does not cling and therefore cannot turn to ice. There is no angle (a, FIG. 4) to pick up the snow and lose traction.

When properly taut, these polyurethane strips are very strong. They will not shift in cornering or when the brakes are suddenly applied. They will not flip over. The material withstands a temperature of minus 40°, and becomes harder, the colder it gets.

In the modification of FIG. 11, each side piece is extended by like shackles 16' and 16'' in succession molded on the inside. Between these two shackles, the side piece is constricted at 26 so as to fold easily, bringing the two shackles 16' and 16'' back to back, forming a single shackle 16 of double the bulk. Beyond the shackle 16'', the side piece ends in a wedge 27.

Then, to attach a side piece to a link 14, it is simply threaded by its end 27 through the link 14, the link is pushed past the two shackles 16' and 16'' far enough so that when the side piece has been folded, it can come back down and lock in the end 27 until the two shackles 16' and 16'' are encountered. A small boss at 31 will secure the link 14 against the shackles 16' and 16''.

Of course, the interior of the link is of such size that the part of the side piece at 16' and 16'' will pass through, while the thickness of the side piece 6 just ahead of the shackle 16' combined with the thickness of the side piece between 31 and 16'' fills up the interior of the link.

In this way, when the side piece 6 is pulled, it is retained by shackles 16' and 16'' back to back, encountering the straight sides of the link 14.

Thus each strip, in one piece, includes its own means of fastening as molded.

This fastening will not come undone of its own accord, if properly made and installed and has been found in use to be entirely dependable.

The security of the fastening of FIG. 2 or 10 may be enhanced with a collar 28 (FIG. 10), horseshoe shaped, narrow enough to keep the shackle 16 from escaping, and large enough so that it will not itself enter the link 14. Then the shackle 16 merely serves as a purchase.

To attach the side piece 6 to the link 14, first the link is threaded on the side piece; then, between it and the shackle, the collar 28 is introduced in a place where the side piece is thin enough to go through the opening in the collar. Then the collar 28 is brought down against the shackle 16.

This fastening consists of a member 20 (FIGS. 12 to 14) of pliant material (preferably polyurethane), having two like portions 36. Its thickness enables it to pass inside the link 29 at the end of any chain connection.

The links at the end of the chain connections 29 (FIG. 9) and those of the lengthwise chains 7 and 8 are assumed longer than they are wide, all alike, the former being able to enter into the latter by one end (FIG. 13). Then if we insert a link 29 in a link 14 (FIG. 13) of either of the two chains 7 and 8, the link 29 will be stopped by the following link 28, striking the sides of link 14, and form a loop of length n greater than the width m of the said member (FIG. 12).

The two portions 36 (FIG. 12) of this member are separated by an interval CD equal to the thickness of the link stock. If a section is taken at ZX perpendicular to CD, a square is obtained, shown shaded in FIG. 13.

Then to attach a link 29 (FIG. 13) to a link 14, link 29 is inserted until the following link 28 strikes 14. Now the member 20 is inserted crosswise in the opening n by one end 36. When CD is reached, the member is rotated a quarter of a turn so that it assumes a position parallel to link 14 (FIG. 14).

If a pull is applied to the chain connection in the direction of the arrow (FIG. 14), link 29 is retained by the ends of the member, striking the straight sides of link 14.

If the interval CD (FIG. 12) will not allow the member to rotate without difficulty, the method of attachment is rendered thoroughly secure. The diagonals of the shaded square (FIG. 13) act as spring projections, the material used being pliant. Hence a twist applied at 36 (FIG. 12) to a locking member grasped between thumb and finger will lock it with exactly a quarter-turn.

The design of this member provides a fastening for skid chains, more flexible, lighter, less expensive, stronger and more silent than the metal hooks of conventional chains.

Its strength depends on the cross section at the smallest place, namely the shaded square in FIG. 13. If the two sides of the link 29 are 7 mm apart (corresponding to the link size commonly used), the area of the square will be 49 mm$^2$. The strength of polyurethane being 5 kg per square millimeter, the strength of the lock will hold 245 kg.

Metal hooks as used in France for skid chains of touring cars weigh about 17 grams, as against a gram and a half for the locking member. The locking member of plastic material, of course, will not rust, and requires no plating. It will damp noise and shocks, and will never come apart of its own accord.

It can take the place of an outside hook 30 (FIG. 9), which weighs 20 to 30 grams. To insert it and rotate it more easily, the area of one portion 36 may be increased as indicated by the dotted outline in FIG. 12, for convenience of grasping it between thumb and finger.

All that is required is that the links to which it is to be attached be longer than they are wide and capable of being inserted in each other.

Similarly, the ends of the chains may be joined with such locking members, and two locking members may be provided, one to secure the chain to the tire and the other to secure the loose end of the extra length of chain. Failing such a precaution, centrifugal force would cause the loose end to strike the fender or produce vibrations.

Thus a complete assembly is obtained, the parts of which consist entirely of lengths of ordinary chain, shoes and locking members, which three sets of parts may be supplied to the user unassembled, for any tire size, and with this kit the user may at will equip his tires with ordinary crosswise chains, or chains with pliant shoes, or chains with chain connection and shoes alternating. He can also easily replace any worn parts.

While the arrangements described are preferred, certain modifications may be made without departing from the scope of the invention, such as those shown in FIGS. 5 to 8 as to the fastening of the shoes.

Likewise, at least one of the lengthwise chains 7 and 8 may be replaced by rigid members 35 (FIG. 15).

To hold the transverse skid chains 9, 10, 11 (FIG. 15) evenly spaced from the pliant transverse members 1, 2, 3, the ends of their side pieces 37 need only have a circular opening admitting the member 35, said end being extended to either side of the side piece at a right angle along a circular arc substantially equal to twice the spacing, the side pieces meeting in the middle. Of course, the pliant transverse members 1, 2, 3 will have the greater thickness.

In the various embodiments of the invention, use may be made of the means disclosed in prior patents to the same inventor in the field of skid chains: French Pat. Nos. 72.19601, 72.24178, 72.30708, 72.32329 and 72.39425 in the name of the same inventor, respectively of May 23, June 26, August 23, September 5 and October 31, 1972.

According to another feature of the invention, the shoes may be preferably of a light color, at least at their side pieces. When the vehicle is traveling at sufficiently high speed, this arrangement, because of stroboscopic effect, will cause the tires to look as if they had light side walls, for example white or yellow.

What is claimed is:

1. Anti-skid means for vehicle tires, comprising a plurality of shoes of pliant material adapted to ring each tire and adapted to be held thereon by two lengthwise link chains terminating in hooks, one of which is in contact with the tire outer side wall and the other with the tire inner side wall, arranged as ladder-type skid chains, said shoes being fabricated in one piece and having a ribbed and textured central portion for the tread of the tire and like side pieces, extending from either side of said central portion and embracing the tire side walls, each said side piece terminating in a shackle, interengaged in links of the lengthwise chains and adapted to hold the shoes removably in place, said shackles having a cross-sectional matching clear space in the links of the lengthwise chains and joining the side pieces by a portion of substantially square cross-section, the side of the square being substantially equal to the width of the link opening, said portion having a length at least equal to the thickness of the link, and the shackles being arranged perpendicular to the plane of the side piece.

2. Anti-skid means for vehicle tires, according to claim 1 wherein the two lengthwise chains comprise links joined together in the manner of the rungs of a ladder, and the shoes of pliant material having side pieces with shackles removably engaging links of the lengthwise chains, arranged alternately with crosswise connections consisting of lengths of chain attached at their ends to links of the lengthwise chains, the said chain links being disposed transversely and being removably attached to the lengthwise chains, and the removable attachment consisting of locking members made up of two shackles joined by a portion of substantially square cross-section, the side of the square matching the width of the link opening and being of a length at least equal to the thickness of the material of which the links are made.

3. Anti-skid means according to claim 1 wherein said shoes are in the form of textured flat strips of pliant material having a length about equal to the width of the tire and about 3 to 5 cm wide, and having a side piece at each end.

4. Anti-skid means according to claim 1 wherein the shackles at the ends of the side pieces are formed by bending the ends of the side pieces, which have enlargements separated by a constriction, the thickness of the enlargements matching the width of the link opening.

5. Anti-skid means according to claim 4 wherein the shackles are supplemented by a collar in the form of a split ring adapted to be placed over the side pieces after insertion of the shackles in the links.

6. Anti-skid means according to claim 3 wherein the shoes are textured to such high relief that the total thickness on the tire is greater than the width of the links of the cross-wise links of chain.

7. Anti-skid means according to claim 1 wherein the shoes are light in color, at least at their side pieces, to provide during rapid rotation a stroboscopic visual effect of correspondingly colored side walls of the tires to which the means are applied.

8. Anti-skid means for vehicle tires according to claim 1 wherein said shoes are molded with sharp and hard projections which during use dig into snow and ice.

9. Anti-skid means for vehicle tires according to claim 8 wherein the shoe projections are of stud form.

* * * * *